United States Patent
Lollis

[19]

[11] Patent Number: 5,813,636
[45] Date of Patent: Sep. 29, 1998

[54] INSTRUMENT GAUGE HOLDERS

[76] Inventor: Gary W. Lollis, 1017 3rd St., Spencer, N.C. 28159

[21] Appl. No.: 934,358

[22] Filed: Sep. 19, 1997

Related U.S. Application Data

[63] Continuation of Ser. No. 516,344, Aug. 17, 1995, abandoned.

[51] Int. Cl.$^6$ ....................................................... G12B 9/00
[52] U.S. Cl. ..................... 248/27.1; 248/231.9; 248/314; 248/904
[58] Field of Search ................................ 248/27.1, 27.3, 248/231.9, 221.11, 314, 904

[56] References Cited

U.S. PATENT DOCUMENTS

| | | | |
|---|---|---|---|
| 785,831 | 3/1905 | Porter . | |
| 1,292,043 | 1/1919 | Porter | 248/27.1 X |
| 1,407,751 | 2/1922 | Jeffers | 248/27.1 X |
| 1,497,922 | 6/1924 | Lux | 248/27.1 |
| 2,100,604 | 11/1937 | Kollsman | 248/27 |
| 2,184,694 | 12/1939 | Cohen | 219/32 |
| 2,506,181 | 5/1950 | Thibault | 219/32 |
| 2,938,698 | 5/1960 | Johnson | 248/27.1 |
| 3,067,974 | 12/1962 | Baldwin | 248/27.1 |
| 3,096,654 | 7/1963 | Du Bois | 248/27.1 X |
| 3,871,606 | 3/1975 | Larson | 248/27 |
| 4,410,155 | 10/1983 | Wetterhern et al. | 248/27.1 |
| 4,413,797 | 11/1983 | Dondervoort | 248/27.1 |
| 4,736,924 | 4/1988 | Bednar | 248/27.1 |
| 4,948,074 | 8/1990 | Bramhall, Jr. | 248/27.1 |
| 5,066,247 | 11/1991 | Watson | 248/27.1 X |

FOREIGN PATENT DOCUMENTS

| | | | |
|---|---|---|---|
| 1185833 | 3/1970 | United Kingdom | 248/27.1 |

*Primary Examiner*—Alvin C. Chin-Shu
*Assistant Examiner*—Long Dinh Phan
*Attorney, Agent, or Firm*—Dougherty & Dremann

[57] ABSTRACT

An improved apparatus for instrument gauge holders which are precision made to fit each gauge properly so they prevent excessive vibration and damage. These holders can easily be properly located to increase the visibility of the gauges, and, importantly, it is not necessary to alter the original factory dash design.

1 Claim, 2 Drawing Sheets

INSTRUMENT GAUGE HOLDERS

CROSS-REFERENCE TO RELATED APPLICATIONS

This is a continuation application of U.S. patent application Ser. No. 08/516,344, filed Aug. 17, 1995, now abandoned.

FIELD OF THE INVENTION

The present invention relates to an apparatus for mounting gauges in a motor vehicle.

1. Background of the Invention

There is presently no gauge holder available to properly stagger or offset competition gauges without being placed in an inconvenient location which requires the driver to turn his head to read them, or without altering original factory dash design. Other presently available competition gauge holders are made of very thin metal which allows excessive vibration of these costly instruments, which can result in damage, while making them difficult to read during such vibration.

2. Description of the Prior Art

Applicant is aware of the following U.S. Patents concerning mounting of instruments or gauges.

| U.S Pat. No. | Inventor | Issue Date | Title |
| --- | --- | --- | --- |
| 785,831 | Porter | 03-28-1905 | AUTOMOBILE CLOCK |
| 2,100,604 | Kollsman | 11-30-1937 | INSTRUMENT MOUNTING |
| 2,184,694 | Cohen | 12-26-1939 | CIGAR LIGHTER |
| 2,506,181 | Thibault | 05-02-1950 | ILLUMINATED CIGAR LIGHTER |
| 3,871,606 | Larson | 03-18-1975 | INSTRUMENT MOUNT |

Porter, U.S. Pat. No. 785,831 teaches an improved automotive clock with particular reference to being set to indicate at a glance the amount of time spent in covering the distance between any two places.

Kollsman, U.S. Pat. No. 2,100,604 teaches a gripping collar to be located in the rear of the instrument board capable of almost universal application to various types of instruments and instrument cases and one which may not only be secured in position from the front of the board by means of screws through the customary screw holes, but one which is caused to be clamped about the instrument case by the manipulation of the usual screws from the front of the board.

Cohen U.S. Pat. No. 2,184,694 teaches a mounting or locking device, particularly to a device for mounting a cigar lighter on the dash board of an automobile.

Thibault U.S. Pat. No. 2,506,181 teaches an illuminating device for a cigar lighter of the removable igniting unit type, wherein the removable unit is carried or stored in a socket-shaped holding device.

Larson U.S. Pat. No. 3,871,606 teaches an instrument mounting including a housing comprising a tubular portion extending through a dashboard opening and adapted to receive a pre-wired instrument. The Larson mount, while having some similarities, is much more complex than the present invention.

SUMMARY OF THE INVENTION

The invented competition instrument gauge holders are precision made to fit each gauge properly so they prevent excessive vibration and damage to the costly instruments. These holders can easily be properly located to increase the visibility of the gauges, and, importantly, it is not necessary to alter the original factory dash design to accommodate them.

The invented gauge holder is a tube having an interior boss at one end as shown in the enclosed cross-section. A gauge is inserted from the end with the boss, and fixed into position by a retainer, the arms of which contact the interior of the boss, which is held by the gauge mounting screws, as shown.

These instrument gauge holders are designed to properly fit the commonly available 2⅝" diameter face (Mallory) instrument gauges with minimum installation effort. Multiple gauge holders can be assembled for a direct face-on-dash position. They can also be assembled in an offset staggered relationship so they can be positioned under the dash (out of the way), but still fully visible to the operator.

The holders may be grouped into configurations, as shown in the attached sketches, and held into such relationship by welding or brazing. The holders may be steel, stainless steel, or plastic.

These holders may also be made for smaller or larger diameter gauges, and can be provided in many different colors.

OBJECTS OF THE INVENTION

The principal object of the present invention is to provide an improved apparatus for mounting additional gauges within a motor vehicle such as an automobile.

A further object of this invention is to provide a gauge mounting apparatus which is sturdy and easy to position.

Another object of the invention is to provide a gauge mounting apparatus which is precision made to fit each gauge properly to prevent excessive vibration and damage to costly instruments.

BRIEF DESCRIPTION OF THE DRAWINGS

The foregoing and other objects will become more readily apparent by referring to the following detailed description and the appended drawings in which.

DETAILED DESCRIPTION

Figure 1:
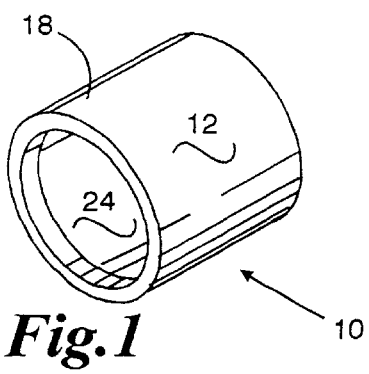
FIG. 1 is an isometric view of a preferred embodiment of the instrument gauge holder.
Figure 2:
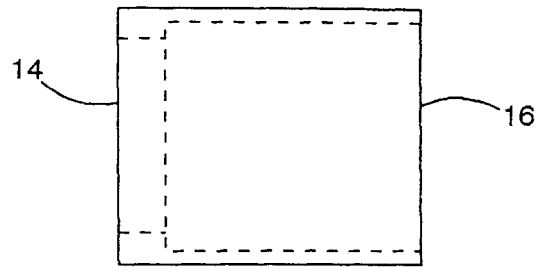
FIG. 2 is a side view of the instrument gauge holder shown in FIG. 1.
Figure 3:
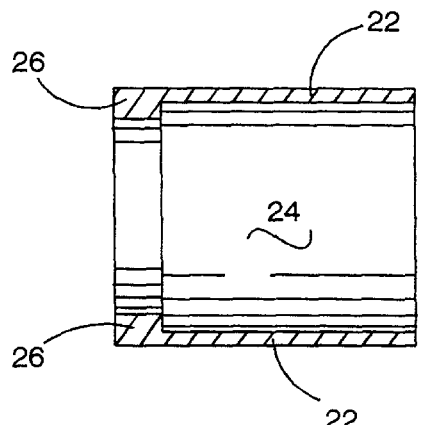
FIG. 3 is a cross sectional view of the instrument gauge holder shown in FIG. 1.
Figure 6:
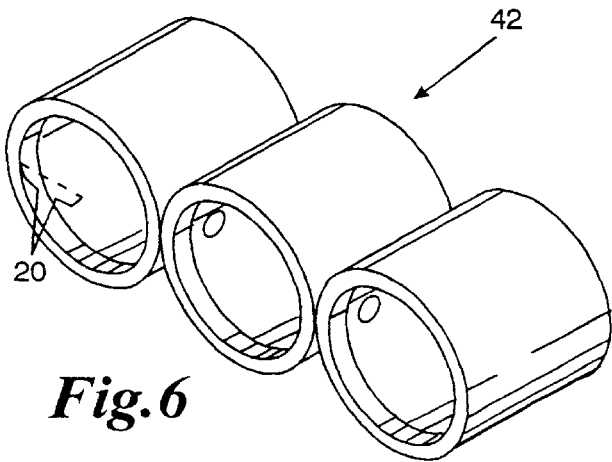
FIG. 6 is an isometric view of a cluster of instrument gauge holders of FIG. 1.
Figure 5:
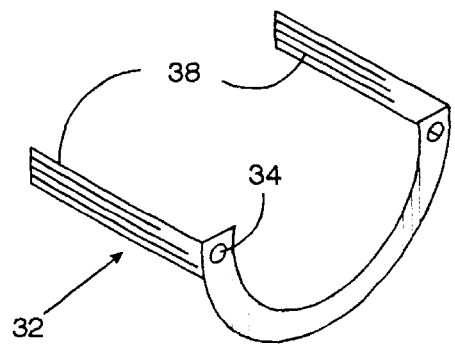
FIG. 5 is an isometric view of the instrument mounting bracket.

Referring now to the drawings, and particularly to FIG. 1, the invented instrument gauge holder device 10 includes a tube 12 having a first end 14, FIG. 2, a second end 16, an exterior circumference 18, and an interior radius 20, FIG. 6. A continuous wall 22 defines an interior channel 24 on the gauge holder. Rim 26, FIG. 3, is located at said first end 14 extending down from said continuous wall 22 into said interior channel 24.

In operation, an instrument 28 (e.g. oil pressure, alternator) is placed in the instrument holder so that the bezel 30 of the instrument is in contact with the rim 26. An instrument mounting bracket 32 is supplied with the instrument. This bracket 32 is placed on the back of the instrument so that bracket orifices 34 receive the instrument contacts 36. Bracket braces 38 are placed for engagement with the inside of rim 26. Nuts 40 on the back of the instrument contacts 36 secure the bracket and the instrument within the instrument gauge holder, FIG. 4.

The tube 12 of the instrument gauge holder is advantageously made of a material selected from the group consisting of, but not limited to: polypropylene (PP), polyethylene (PE), polyvinyl chloride (PVC), chlorinated polyvinyl chloride (CPVC), polyvinylidene fluoride (PVDF), ultra high molecular weight polyethylene (UHMW PE), ethylene chlorotrifluoroethylene (ECTFE), ethylene tetrafluoroethylene (ETFE), chlorotrifluoroethylene (CTFE), fluorinated ethylene propylene (FEP), perfluoroalkoxy (PFA), acrylonitrile-butadiene-styrene (ABS), fiberglass reinforced plastic (FRP), fiberglass reinforced vinyl ester, fiberglass reinforced epoxy, polyphenylene sulfide (PPS), polyphthalamide (PPA), fiberglass reinforced polyvinylchloride, fiberglass reinforced polyester, polyether ether ketone (PEEK), or polysulfone. The tube 12 of the instrument gauge holder 10 can also be made of a material selected from the group consisting of, but not limited to: brass, bronze, copper, aluminum, steel, stainless steel, and alloys thereof such as HASTELLOY™, INCONEL™, or MONEL™.

The instrument gauge holder may also have at least part of the external circumferential surface textured, chrome plated or finished in NEXTEL.

Figure 4:
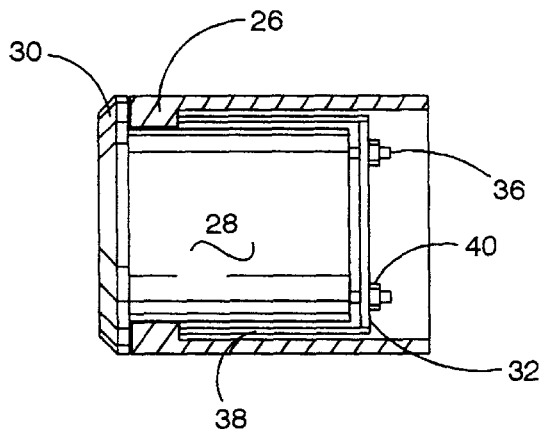
FIG. 4 is a cross sectional view of the instrument gauge holder shown in FIG. 1 with the gauge inserted.
Figure 7:
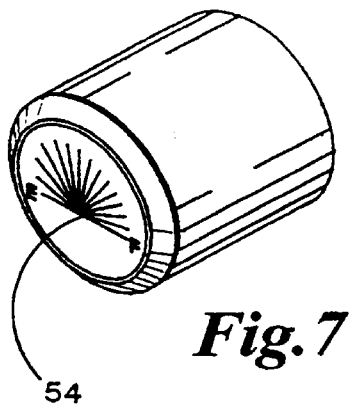
FIG. 7 is an isometric view of the instrument gauge holder of FIG. 1 with the gauge inserted.

In combination with an instrument gauge 28, FIG. 4, and a mounting bracket 32, in which the gauge has a face 54, FIG. 7, and opposed rearwardly extending contacts 36, an instrument gauge holder device 10 for shielding the gauge from shock and vibration is provided for receiving and firmly retaining the gauge in position. The instrument gauge holder device 10 is comprised of a tubular cover member 10 having an opened distal end 16, FIG. 2, and an open proximal end 14 having a rim 26 adapted for engagement of a gauge bezel 30. An interior cross sectional dimension of the tube 12 is adapted for fitting loosely over the gauge. Engagement of the mounting bracket 32 with the contacts 36 and the interior of the rim 26 provides a secure retainment of the gauge 28 within the tube 12.

ALTERNATIVE EMBODIMENTS

The invented gauge holder is engineered to allow several of the invented gauge holders to be secured together to form an instrument cluster 42, FIG. 6. The individual gauge holders can be positioned at an angle to afford the operator of the vehicle an unobstructed path of vision.

Figure 8:
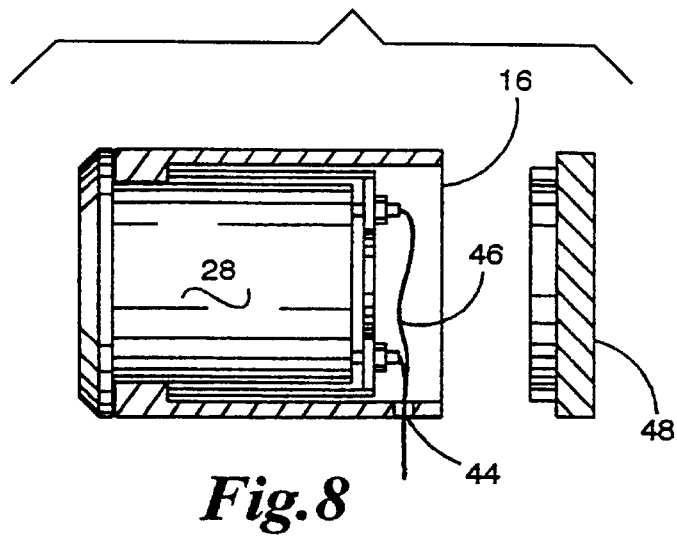
FIG. 8 is a cross sectional view of the instrument gauge holder shown in FIG. 7 with the gauge inserted and a cap.
Figure 11:
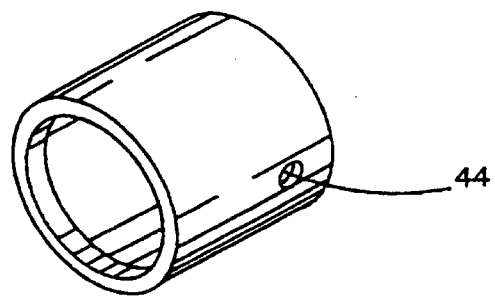
FIG. 11 is an isometric view of the instrument gauge holder of FIG. 7 rotated to show the optional wire orifice.

The basic gauge holder can also include an orifice 44, FIG. 11 in the continuous wall of the gauge holder to facilitate the proper routing of wires 46, FIG. 8, to the appropriate sensors.

Figure 9:
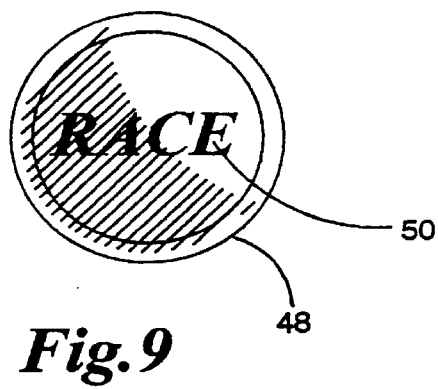
FIG. 9 is a front view of the cap for the instrument gauge holder decorated with indicia.

When the gauge holder is mounted to the upper surface of the dash, a cap 48, FIG. 8 can be fitted to the rear 16 of the gauge holder to conceal the wires, mountings and connections. These caps can be finished to match the gauge holder or they can be ornamented with indicia 50, FIG. 9, such as the name or logo of a sponsor.

Figure 10:
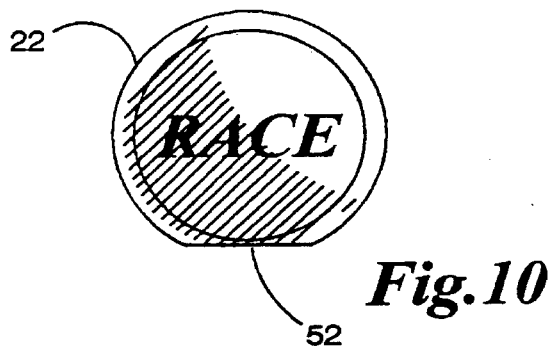
FIG. 10 is a front view of an alternative embodiment of the instrument gauge holder with a flat mounting surface.

To facilitate mounting to a flat upper surface such as the surface of a dash board, the continuous wall 22 of the tube may be configured with a flat surface 52, FIG. 10.

It should be noted that while we have mentioned MALLORY gauges in this application, most other gauges from manufacturers such as, but not limited to, RACEPARTS, STEWART-WARNER, VDO, STACK and JONES are suitable for use with the invented gauge holder.

SUMMARY OF THE ACHIEVEMENT OF THE OBJECTS OF THE INVENTION

From the foregoing, it is readily apparent that I have invented an improved apparatus for mounting additional gauges within a motor vehicle such as an automobile, which is sturdy, easy to position, precision made to fit each gauge and which prevents excessive vibration and damage.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An instrument gauge holder for mounting an instrument gauge, said instrument gauge holder comprising:

a cylindrical tube comprising a first end, a second end and a continuous wall extending between said first end and said second end and defining an interior channel, said wall having an exterior surface, an interior surface and an aperture therethrough for permitting instrument gauge wires to pass through said wall, said exterior surface of said wall comprising a flat surface portion for mounting the instrument gauge holder on a flat surface, said tube further comprising a rim adjacent said first end and extending radially inwardly from the interior surface of said wall into the interior channel;

a mounting bracket comprising a pair of diametrically opposed braces for engaging said rim within the interior channel defined by said tube to mount the instrument gauge to the instrument gauge holder;

a cap comprising
      a round disk having a front surface, a back surface and a continuous exterior edge; and
      a lip adjacent the back surface of said disk and spaced radially outwardly from said continuous exterior edge;
      whereby said continuous exterior edge of said disk is removably engagable with said interior surface of said tube adjacent said second end.

* * * * *